US 6,535,990 B1

(12) United States Patent
Iterum et al.

(10) Patent No.: US 6,535,990 B1
(45) Date of Patent: Mar. 18, 2003

(54) METHOD AND APPARATUS FOR PROVIDING FAULT-TOLERANT ADDRESSES FOR NODES IN A CLUSTERED SYSTEM

(75) Inventors: Skef F. Iterum, San Francisco, CA (US); Ying Xie, San Jose, CA (US); Madhusudhan K. Talluri, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/480,148

(22) Filed: Jan. 10, 2000

(51) Int. Cl.$^7$ .................................................. G06F 11/00
(52) U.S. Cl. .......................................... 714/4; 709/220
(58) Field of Search ............................... 714/4, 2, 8, 11, 714/25, 27, 39, 43, 47, 56; 709/220, 221, 229, 239, 242, 292

(56) References Cited

U.S. PATENT DOCUMENTS

| | | | |
|---|---|---|---|
| 5,173,689 A | * 12/1992 | Kusano | 340/827 |
| 5,229,990 A | * 7/1993 | Teraslinna | 370/60 |
| 5,577,030 A | 11/1996 | Oki et al. | 370/54 |
| 5,774,640 A | 6/1998 | Kurio | 395/182.02 |
| 5,793,746 A | * 8/1998 | Gerstel et al. | 370/228 |
| 5,856,981 A | * 1/1999 | Voelker | 371/20.1 |
| 5,883,939 A | * 3/1999 | Friedman et al. | 379/9 |
| 5,898,827 A | * 4/1999 | Hornung et al. | 395/182.09 |
| 6,111,881 A | * 8/2000 | Soncodi | 370/395 |
| 6,112,249 A | * 8/2000 | Bader et al. | 709/220 |
| 6,115,753 A | * 9/2000 | Joens | 709/242 |
| 6,272,139 B1 | * 8/2001 | Soncodi | 370/395 |
| 6,393,485 B1 | * 5/2002 | Chao et al. | 709/231 |

FOREIGN PATENT DOCUMENTS

| | | |
|---|---|---|
| EP | 0 841 824 A2 | 5/1998 |
| WO | WO 99/59064 | 11/1999 |

* cited by examiner

Primary Examiner—Nadeem Iqbal
(74) Attorney, Agent, or Firm—Park, Vaughan & Fleming LLP; Pavel Pogodin

(57) ABSTRACT

One embodiment of the present invention provides a system that facilitates communications between a cluster of nodes within a clustered computing system in a manner that tolerates failures of communication pathways between the nodes. The system operates by configuring a distinct logical pathway between each possible source node and each possible destination node in the cluster, so that each distinct logical pathway is routed across one of at least two disjoint physical pathways between each possible source node and each possible destination node. In doing so, the system configures a first logical pathway between a first node and a second node across a first physical pathway of at least two disjoint physical pathways between the first node and the second node. Upon detecting a failure of the first physical pathway, the system reroutes the first logical pathway across a second physical pathway from the at least two disjoint physical pathways between the first node and the second node. In one embodiment of the present invention, the system associates a distinct per-node logical address with each node in the cluster. For each source node, the system associates the per-node logical address of each possible destination node with a corresponding logical pathway to the destination node. In this way, a communication from a given source node to a per-node logical address of a given destination node is directed across the corresponding logical pathway to the given destination node.

18 Claims, 4 Drawing Sheets

NODE 104: DESTINATION=L2, GATEWAY=L1,2
NODE 104: DESTINATION=L3, GATEWAY=L1,3
NODE 104: DESTINATION=L4, GATEWAY=L1,4
NODE 105: DESTINATION=L1, GATEWAY=L2,1
NODE 106: DESTINATION=L1, GATEWAY=L3,1
NODE 107: DESTINATION=L1, GATEWAY=L4,1

METHOD AND APPARATUS FOR PROVIDING FAULT-TOLERANT ADDRESSES FOR NODES IN A CLUSTERED SYSTEM

BACKGROUND

1. Field of the Invention

The present invention relates to computer networks and clustered computing systems. More specifically, the present invention relates to a method and an apparatus for providing per-node addresses in a clustered computing system that can tolerate failures of communication pathways between the nodes in the clustered computing system.

2. Related Art

Clustered computing systems allow multiple computing nodes to work together in accomplishing a computational task. In a clustered computing system, a plurality of computing nodes are typically coupled together through one or more computing networks so that each node in the cluster is able to communicate with every other node.

Clustered computing systems are often designed to be fault-tolerant so that a clustered computing system can continue to function if individual components within the clustered computing system fail. One particular problem in providing fault-tolerance is to design a system that can tolerate failures on the communication pathways that link together the nodes of the clustered computing system. Such failures can occur, for example, in cables, in network interface cards (NICs) within the computing nodes, and within intermediate networking equipment, such as a hub or a switch.

In designing a fault-tolerant communication mechanism, it is desirable to use an industry standard communication protocol, such as the Transmission control Protocol Internet Protocol (TCP/IP), so that existing components, which make use of these industry standard protocols, can be used within the clustered computing system. More specifically, it is desirable for each machine in a cluster have its own IP address that can be used to contact the machine from any other machine in the cluster.

It is also desirable for the fault-tolerant communication mechanism to provide at least two disjoint physical communication pathways between each pair of nodes in the clustered computing system. In this way, if a single communication pathway fails, the system is able to provide an alternative communication pathway.

Providing a fault-tolerant TCP/IP network is relatively easy in the case where there are multiple redundant networks, and where all of the nodes in the computing system are attached to each of the redundant networks. In this case, fault-tolerance can be provided by assigning each machine its own IP address on a primary network. If a path fails within the primary network network, the system simply moves all of the IP addresses to an alternative functioning network.

Unfortunately, in many clustered computing systems the computing nodes are not all attached to all of the networks. For example, each machine may have a point-to-point connection to every other machine, or there may exist multiple hubs or switches that only connect to a subset of the nodes in the cluster. If this is the case, it is not possible to create a single IP network that spans all of the nodes in the cluster because of a limitation of TCP/IP. In TCP/IP, a unique IP number can only be hosted on at most one network adapter on a single machine at any given time. This restriction prevents configuring a single IP address on multiple network interfaces in order to span arbitrary network configurations.

Hence, what is needed is a method and an apparatus that provides a fault-tolerant communication mechanism for nodes within a clustered computing system that supports arbitrary fault-tolerant interconnection topologies and allows each node in the cluster to be accessible through its own address.

SUMMARY

One embodiment of the present invention provides a system that facilitates communications between a cluster of nodes within a clustered computing system in a manner that tolerates failures of communication pathways between the nodes. The system operates by configuring a distinct logical pathway between each possible source node and each possible destination node in the cluster, so that each distinct logical pathway is routed across one of at least two disjoint physical pathways between each possible source node and each possible destination node. In doing so, the system configures a first logical pathway between a first node and a second node across a first physical pathway of at least two disjoint physical pathways between the first node and the second node. Upon detecting a failure of the first physical pathway, the system reroutes the first logical pathway across a second physical pathway from the at least two disjoint physical pathways between the first node and the second node.

In one embodiment of the present invention, the system associates a distinct per-node logical address with each node in the cluster. For each source node, the system associates the per-node logical address of each possible destination node with a corresponding logical pathway to the destination node. In this way, a communication from a given source node to a per-node logical address of a given destination node is directed across the corresponding logical pathway to the given destination node. In a variation on this embodiment, the distinct pernode logical address includes a distinct Internet Protocol (IP) address. In a variation on this embodiment, associating the distinct per-node logical address with each node in the cluster involves hosting the distinct per-node logical address on a loop-back interface within each node in the cluster.

In one embodiment of the present invention, the system associates two distinct Internet Protocol (IP) addresses with each distinct logical pathway, one for each of two nodes located on opposite ends of the pathway.

In one embodiment of the present invention, the system associates a distinct Internet Protocol (IP) network with each distinct logical pathway, wherein the two distinct IP addresses associated with each distinct logical pathway are located on the associated distinct IP network.

In one embodiment of the present invention, detecting the failure of the first physical pathway involves using a monitor to periodically test physical pathways in the cluster.

In one embodiment of the present invention, rerouting the first logical pathway involves: bringing down the first logical pathway over the first physical pathway without bringing down connections through the first logical pathway; and bringing up the first logical pathway over the second physical pathway.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Clustered Computing System

Figure 1:
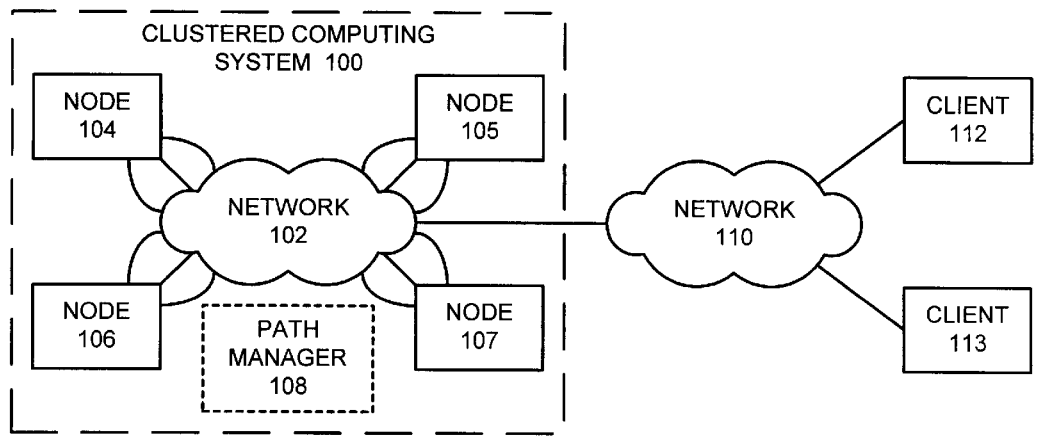
FIG. 1 illustrates a clustered computing system in accordance with an embodiment of the present invention.

FIG. 1 illustrates a clustered computing system 100 in accordance with an embodiment of the present invention. In FIG. 1, clustered computing system 100 is coupled to clients 112–113 through network 110. Clients 112–113 can include any node on network 110 including computational capability and including a mechanism for communicating across network 110. In one embodiment of the present invention, clients 112–113 communicate with clustered computing system 100 by sending packets to clustered computing system 100 in order to request services from clustered computing system 100.

Network 110 can include any type of wire or wireless communication channel capable of coupling together computing nodes. This includes, but is not limited to, a local area network, a wide area network, or a combination of networks. In one embodiment of the present invention, network 110 includes the Internet.

Clustered computing system 100 includes a set of nodes 104–107 that are coupled together through network 102. Network 102 can include any type of wire or wireless communication channel capable of coupling together computing nodes. This includes, but is not limited to, a local area network, a wide area network, or a combination of networks. In one embodiment of the present invention, network 102 supports communications adhering to the Ethernet or the scalable coherent interconnect (SCI) standards, as well as the TCP/IP protocol.

Note that network 102 provides at least two disjoint communication pathways between any two nodes in clustered computing system 100. In this way if a communication pathway fails, another communication pathway is available to take its place. Also note that network 102 can include a number of separate networks that couple together subsets of the nodes within clustered computing system 100. These separate networks can include any type of physical interconnections, including bus connections, switch-based connections and point to-point connections.

In one embodiment of the present invention, path manager 108 operates in a distributed fashion through a local component residing within each node in clustered computing system 100. Path manager 108 knows about the interconnection topology of clustered computing system 100 and monitors the status of communication pathways through clustered computing system 100. Path manager 108 also provides an interface registry through which other components interested in the status of the interconnect can register. This provides a mechanism for path manager 108 to make callbacks to the interested components when the status of a path changes, if a new path comes up, or if a path is removed.

Nodes 104–107 can include any type of computer system, including a computer system based on a microprocessor, a mainframe computer, a digital signal processor, a personal organizer, a device controller, and a computational engine within an appliance.

In one embodiment of the present invention, nodes 104–107 function as server nodes including a mechanism for servicing requests from clients 112–113 for computational or data storage resources within nodes 104–107.

Shifting a Logical Path to an Alternative Physical Path

Figure 2:
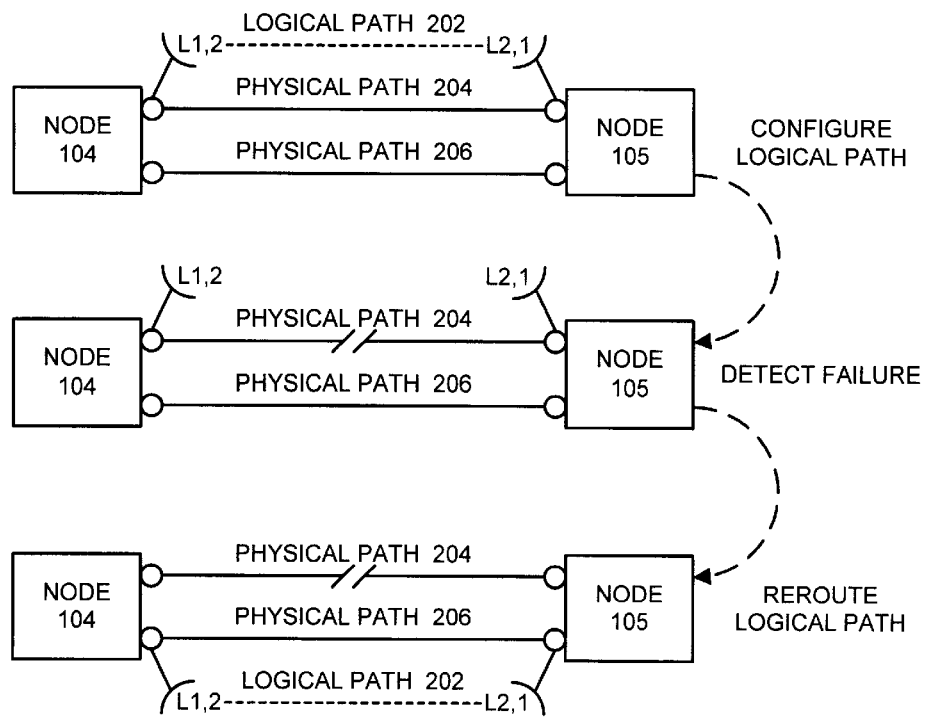
FIG. 2 illustrates the process of shifting a logical path to an alternative physical path when a physical path fails in accordance with an embodiment of the present invention.

FIG. 2 illustrates the process of shifting a logical path to an alternative physical path when a physical path fails in accordance with an embodiment of the present invention. The top portion of FIG. 2 illustrates communication pathways between nodes 104 and 105 within clustered computing system 100. Nodes 104 and 105 are coupled together through physical path 204 and physical path 206, which are disjoint from each other so that if one of physical paths 204 or 206 fails, the other one can take its place.

In the top portion of FIG. 2, a logical path 202 is configured so that it is associated with physical path 204. In this way, a communication from node 104 to node 105 passes through logical path 202, which actually transfers the communication across physical path 204. (Note that logical path 202 actually represents two logical pathways, a first logical path from node 104 to node 105 and a second logical path from node 105 to node 104.)

In the middle portion of FIG. 2, a failure of physical path 204 is detected by path manager 108 from FIG. 1. (Note that this detection process involves periodically sending "heartbeats" across all of the physical pathways in network 102.)

When a failure is detected, the system reroutes logical path 202 so that it is associated with physical path 206. This allows communications through logical path 202 to continue through physical path 206 in spite of the failure of physical path 204.

In one embodiment of the present invention, this rerouting is accomplished by bringing down logical path 202 over physical path 204, without bringing down connections through logical path 202, and then bringing up logical path 202 over physical path 206. In this way, connections through logical path 202 are preserved during the rerouting process.

Example Interconnection Topology

Figures 3A, 3B:
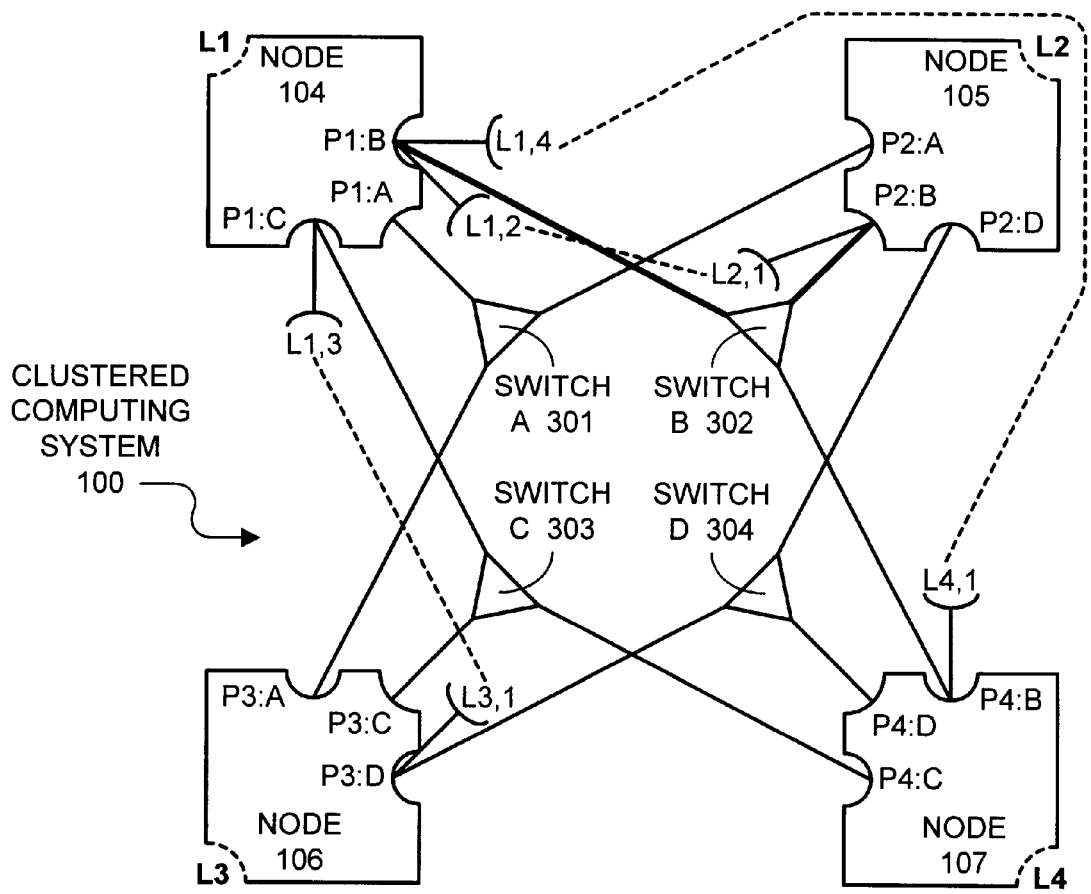
FIG. 3A illustrates an example interconnection topology for a clustered computing system in accordance with an embodiment of the present invention.
FIG. 3B illustrates a routing table for the example interconnection topology illustrated in FIG. 3A in accordance with an embodiment of the present invention.

FIG. 3A illustrates an example interconnection topology for clustered computing system 100 in accordance with an embodiment of the present invention. As in FIG. 1, clustered computing system 100 includes nodes 104–107, which are coupled together by network 102.

In the example interconnection topology illustrated in FIG. 3A, network 102 includes four switches, including switch A 301, switch B 302, switch C 303 and switch D 304, which couple together nodes 104–107. More specifically, switch A 301 provides a communication pathway between interface P1:A on node 104, interface P2:A on node 105 and interface P3:A on node 106. Switch B 302 provides a communication pathway between interface P1:B on node 104, interface P2:B on node 105 and interface P4:B on node 107. Switch C 303 provides a communication pathway between interface P1:C on node 104, interface P3:C on node 106 and interface P4:C on node 107. Finally, switch D 304 provides a communication pathway between interface P2:D on node 105, interface P3:D on node 106 and interface P4:D on node 107.

Note that there exist at least two disjoint communication pathways between each pair of nodes in clustered computing system 100. For example, Node 104 is coupled to node 105 through a pathway through interface P1:A on node 104, switch A 301 and interface P2:A on node 105. Node 104 is also coupled to node 105 through an alternative pathway through interface P1:B on node 104, switch B 302 and interface P2:B on node 105.

In this embodiment of the present invention, also note that none of switches 301–304 are coupled to all of nodes 104–107 in clustered computing system 100.

Nodes 104–107 host per-node IP addresses on their internal loopback interfaces. Recall that a loopback interface is a pseudo-device implemented on the IP stack of a computer system that acts like a software network adapter. A loopback interface is generally used to form IP connections between applications on the same machine. Also note that a loop back interface is not associated with underlying hardware components that can fail. Referring to FIG. 3A, per-node IP address L1 is hosted on the loop-back interface of node 104. Per-node IP address L2 is hosted on the loop-back interface of node 105. Per-node IP address L3 is hosted on the loop-back interface of node 106. Finally, per-node IP address L4 is hosted on the loop-back interface of node 107.

As in the example illustrated in FIG. 2, logical paths between nodes 104–107 are associated with various physical paths between nodes 104–107. More specifically, logical path L1,2 from node 104 to node 105 is associated with a physical path through switch B 302. In the opposite direction, logical path L2,1 from node 105 to node 104 is also associated with the physical path through switch B 302.

Logical path L1,3 from node 104 to node 106 is associated with a physical path through switch C 303. In the opposite direction, logical path L3,1 from node 106 to node 104 is also associated with the physical path through switch C 303.

Logical path L1,4 from node 104 to node 107 is associated with a physical path through switch B 302. In the opposite direction, logical path L4,1 from node 107 to node 104 is also associated with the physical path through switch B 302.

Note that FIG. 3A illustrates only logical paths involving node 104. Other logical paths between nodes 105–107 are not shown.

Routing Table

FIG. 3B illustrates the contents of a routing table for the example interconnection topology illustrated in FIG. 3A in accordance with an embodiment of the present invention. This table illustrates how destination per-node IP addresses are associated with logical paths involving node 104. Within node 104, destination per-node IP address L2 is associated with logical path L1,2, destination per-node IP address L3 is associated with logical path L1,3, and destination per-node IP address L4 is associated with logical path L1,4.

In the reverse direction, within node 105, destination per-node IP address L1 is associated with logical path L2,1. Within node 106, destination per-node IP address L1 is associated with logical path L3,1. Within node 107, destination per-node IP address L1 is associated with logical path L4,1.

Note that this table maps destination per-node IP addresses to logical paths, and hence, will not change if a logical path is moved to an alternative physical path.

Also note that other logical paths between nodes 105–107 are not shown.

Example Interconnection Topology After Communication Link Failure

Figure 4:
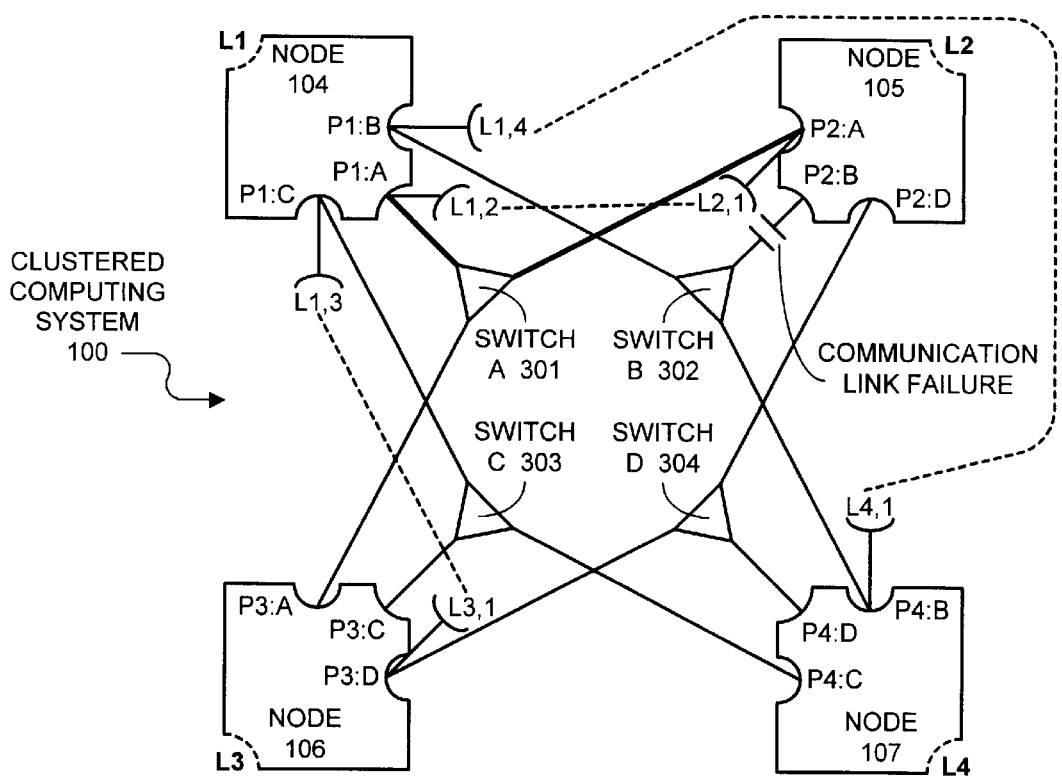
FIG. 4 illustrates the example interconnection topology after a failure of a communication link in accordance with an embodiment of the present invention.

FIG. 4 illustrates the example interconnection topology after a failure of a communication link in accordance with an embodiment of the present invention. The example illustrated in FIG. 4 is the same as the example illustrated in FIG. 3A, except that there is a failure in the communication link between interface P2:B on node 105 and switch B 302. This failure affects the logical path L1,2 between nodes 104 and 105 as well as logical path L2,1 between nodes 105 and 104. This failure does not affect any of the other illustrated logical paths. (Although logical path L1,4 and logical path L4,1 also pass through switch B 302, they are not affected by the failure of the communication link between switch B 302 and interface P2:B on node 105.)

Once the failure is detected, logical paths L1,2 and L2,1 are routed around the failed communication link. This is done by reconfiguring logical paths L1,2 and L2,1 to be associated with an alternative physical path, which passes through interface P1:A in node 104, switch A 301 and interface P2:A in node 105.

Configuring and Operating Fault-Tolerant Communication Mechanism

Figure 5:
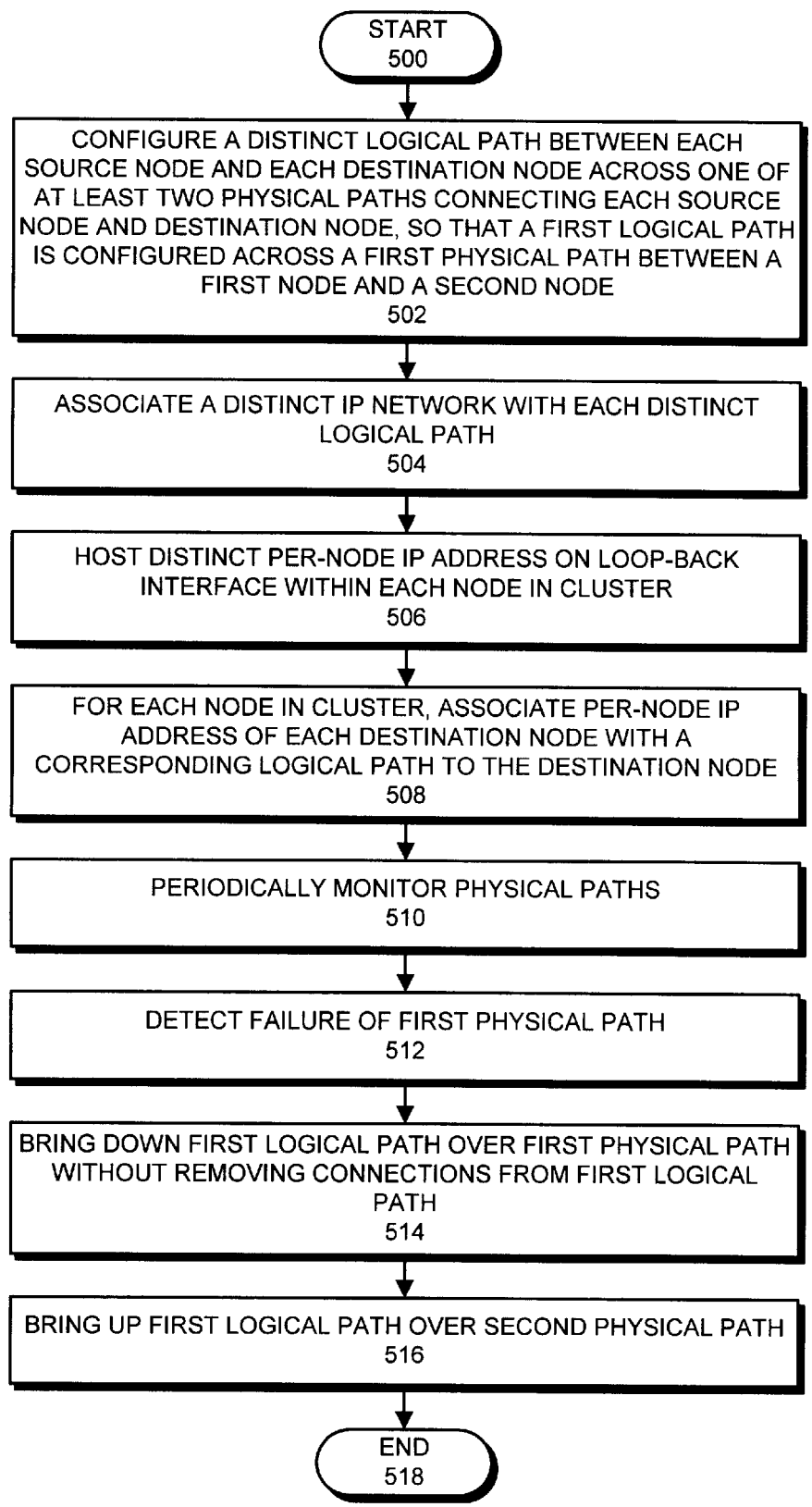
FIG. 5 presents a flow chart illustrating the process of configuring and operating a fault-tolerant communication mechanism in accordance with an embodiment of the present invention.

FIG. 5 presents a flow chart illustrating the process of configuring and operating a fault-tolerant communication mechanism in accordance with an embodiment of the present invention.

The system starts by configuring a distinct logical path between each possible source node and each destination node across one of at least two disjoint physical pathways connecting each source node and each destination node (step 502). Note that this process involves configuring a first logical path across a first physical path between a first node and a second node in the cluster. In one embodiment, the system associates two distinct Internet Protocol (IP) addresses with each distinct logical pathway, one for each of two nodes located on opposite ends of the pathway.

In one embodiment, this configuration process also involves associating a distinct IP network with each distinct logical path (step 504). (We refer to each of these distinct IP networks as a "pair-wise" network, because the IP network couples together a "pair" of nodes.) Note that the two distinct IP addresses associated with each distinct logical pathway are located on the associated distinct IP network.

In one embodiment of the present invention, during the configuration process, the system also hosts a distinct per-node IP addresses on a loop-back interface within each node in the cluster (step 506). For example, in node 104 in FIG. 3A, per-node IP address L1 is hosted in the loopback interface of node 104.

Next, for each node in the cluster, the system associates the per-node IP address of each destination node with a corresponding logical path to the destination node (step 508). For example, in node 104 in FIG. 3A, per-node IP address L2 for destination node 105 is associated with logical path L1,2.

After the configuration process is complete, the system progresses to normal system operation. During normal system operation, path manager 108 (from FIG. 1) periodically monitors the status of physical paths within network 102 (step 510).

At some time during this monitoring process, the system detects a failure of the first physical path (step 512). In this case, the system reroutes the first logical path onto an alternative second physical path. This is accomplished by bringing down the first logical path over the first physical path without bringing down connections from the first logical path (step 514). Next, the system brings up the first logical path over the alternative second physical path (step 516). In this way, connections through the first logical path are maintained during the rerouting process. Note that the routing tables, which map per-node addresses onto logical paths do not change during this rerouting process because the logical paths do not change; only the associations between logical paths and physical paths change.

Note there exists an agreement system, which enables nodes at opposite ends of a pathway to agree on what path should be used. In one embodiment of the present invention, the nodes negotiate outside of the above-described protocol to determine what alternative path to use whenever a path fails. In another embodiment of the present invention, there exists a strict ordering of preference for all the paths between two nodes, and the most preferred path is always used. Using this system means that if the most preferred path has previously failed and then starts to function again, the logical pairwise network moves back onto the newly restored more preferred path to ensure agreement. This means that logical paths might be moved in the case of path restoration, not just path failure.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for providing communications between a cluster of nodes in a clustered computing system in a manner that tolerates failures of communication pathways between the cluster of nodes, comprising:

configuring a distinct logical pathway between each possible source node and each possible destination node in the cluster of nodes, so that each distinct logical pathway is routed across one of at least two disjoint physical pathways between each possible source node and each possible destination node;

wherein the distinct logical pathway between each possible source node includes a first logical pathway between a first node and a second node in the cluster of nodes, so that the first logical pathway is routed across a first physical pathway of at least two disjoint physical pathways between the first node and the second node;

associating a distinct per-node logical address with each node in the cluster;

for each source node in the cluster, associating the per-node logical address for each destination node in the cluster with a corresponding logical pathway to the destination node, so that a communication from a given source node to a given per-node logical address of a given destination node is directed across the corresponding logical pathway to the given destination node;

detecting a failure of the first physical pathway; and rerouting the first logical pathway across a second one of the at least two disjoint physical pathways between the first node and the second node.

2. The method of claim 1, wherein associating the distinct per-node logical address with each node in the cluster involves hosting the distinct per-node logical address on a loop-back interface within each node in the cluster.

3. The method of claim 1, further comprising associating two distinct Internet Protocol (IP) addresses with each distinct logical pathway, one for each of two nodes located on opposite ends of the pathway.

4. The method of claim 3, further comprising associating a distinct Internet Protocol (IP) network with each distinct logical pathway, wherein the two associated distinct IP addresses associated with each distinct logical pathway are located on the associated distinct IP network.

5. The method of claim 1, wherein detecting the failure of the first physical pathway involves using a monitor to periodically test physical pathways.

6. The method of claim 1, wherein rerouting the first logical pathway involves:

bringing down the first logical pathway over the first physical pathway without bringing down connections through the first logical pathway; and bringing up the first logical pathway over the second physical pathway.

7. A computer-readable storage medium storing instructions that when executed by a computer cause the computer to perform a method for providing communications between a cluster of nodes in a clustered computing system in a manner that tolerates failures of communication pathways between the cluster of nodes, the method comprising:

configuring a distinct logical pathway between each possible source node and each possible destination node in the cluster of nodes, so that each distinct logical pathway is routed across one of at least two disjoint physical pathways between each possible source node and each possible destination node.

wherein the distinct logical pathway between each possible source node includes a first logical pathway between a first node and a second node in the cluster of nodes, so that the first logical pathway is routed across a first physical pathway of at least two disjoint physical pathways between the first node and the second node;

associating a distinct per-node logical address with each node in the cluster;

for each source node in the cluster, associating the per-node logical address for each destination node in the cluster with a corresponding logical pathway to the destination node, so that a communication from a given source node to a given per-node logical address of a given destination node is directed across the corresponding logical pathway to the given destination node;

detecting a failure of the first physical pathway; and rerouting the first logical pathway across a second one of the at least two disjoint physical pathways between the first node and the second node.

8. The computer-readable storage medium of claim 7, wherein associating the distinct per-node logical address with each node in the cluster involves hosting the distinct per-node logical address on a loop-back interface within each node in the cluster.

9. The computer-readable storage medium of claim 7, wherein the method further comprises associating two distinct Internet Protocol (IP) addresses with each distinct logical pathway, one for each of two nodes located on opposite ends of the pathway.

10. The computer-readable storage medium of claim 9, wherein the method further comprises associating a distinct Internet Protocol (IP) network with each distinct logical pathway, and wherein the two associated distinct IP addresses associated with each distinct logical pathway are located on the associated distinct IP network.

11. The computer-readable storage medium of claim 7, wherein detecting the failure of the first physical pathway involves using a monitor to periodically test physical pathways.

12. The computer-readable storage medium of claim 7, wherein rerouting the first logical pathway involves:

bringing down the first logical pathway over the first physical pathway without bringing down connections through the first logical pathway; and bringing up the first logical pathway over the second physical pathway.

13. An apparatus that provides communications between a cluster of nodes in a clustered computing system in a manner that tolerates failures of communication pathways between the cluster of nodes, comprising:

a configuration mechanism that configures a distinct logical pathway between each possible source node and each possible destination node in the cluster of nodes, so that each distinct logical pathway is routed across one of at least two disjoint physical pathways between each possible source node and each possible destination node wherein the configuration mechanism further configures a first logical pathway between a first node and a second node in the cluster of nodes, so that the first logical pathway is routed across a first physical pathway of at least two disjoint physical pathways between the first node and the second node;

an association mechanism that is configured to:

associate a distinct per-node logical address with each node in the cluster, and for each source node in the cluster, to associate the per-node logical address for each destination node in the cluster with a corresponding logical pathway to the destination node, so that a communication from a given source node to a given per-node logical address of a given destination node is directed across the corresponding logical pathway to the given destination node;

a detection mechanism that detects a failure of the first physical pathway; and a rerouting mechanism that reroutes the first logical pathway across a second one of the at least two disjoint physical pathways between the first node and the second node when the detection mechanism.

14. The apparatus of claim 13, wherein the association mechanism is configured to associate the distinct per-node logical address with each node in the cluster by hosting the distinct per-node logical address on a loop-back interface within each node in the cluster.

15. The apparatus of claim 13, wherein the association mechanism is configured to associate two distinct Internet Protocol (IP) addresses with each distinct logical pathway, one for each of two nodes located on opposite ends of the pathway.

16. The apparatus of claim 15, wherein the association mechanism is configured to associate a distinct Internet Protocol (IP) network with each distinct logical pathway, and wherein the two associated distinct IP addresses associated with each distinct logical pathway are located on the associated distinct IP network.

17. The apparatus of claim 13, wherein the detection mechanism is configured to detect the failure of the first physical pathway by using a monitor to periodically test physical pathways.

18. The apparatus of claim 13, wherein the rerouting mechanism is configured to:

bring down the first logical pathway over the first physical pathway without bringing down connections through the first logical pathway; and to bring up the first logical pathway over the second physical pathway.

* * * * *